US012756115B2

(12) United States Patent
Riechmann et al.

(10) Patent No.: US 12,756,115 B2
(45) Date of Patent: Oct. 6, 2026

(54) ELECTRICAL CONTACT ELEMENT AND METHOD FOR CONNECTING A CONDUCTOR TO SAME

(71) Applicant: HARTING ELECTRIC STIFTUNG & CO. KG, Espelkamp (DE)

(72) Inventors: Till Riechmann, Stemmwede (DE); Markus Friesen, Espelkamp (DE)

(73) Assignee: HARTING ELECTRIC STIFTUNG & CO. KG, Espelkamp (DE)

(*) Notice: Subject to any disclaimer, the term of this patent is extended or adjusted under 35 U.S.C. 154(b) by 381 days.

(21) Appl. No.: 18/294,988

(22) PCT Filed: Jul. 22, 2022

(86) PCT No.: PCT/DE2022/100534

§ 371 (c)(1),
(2) Date: Feb. 2, 2024

(87) PCT Pub. No.: WO2023/011686

PCT Pub. Date: Feb. 9, 2023

(65) Prior Publication Data

US 2024/0250454 A1 Jul. 25, 2024

(30) Foreign Application Priority Data

Aug. 6, 2021 (DE) ..................... 10 2021 120 465.8

(51) Int. Cl.
*H01R 4/06* (2006.01)
*H01R 43/04* (2006.01)

(52) U.S. Cl.
CPC ............... *H01R 4/06* (2013.01); *H01R 43/04* (2013.01)

(58) Field of Classification Search
CPC ................................. H01R 4/06; H01R 43/04
See application file for complete search history.

(56) References Cited

U.S. PATENT DOCUMENTS 2,777,117 A * 1/1957 Shrider ................ H01R 4/5033 439/428
2,940,060 A * 6/1960 Haegert ............... H01R 11/281 439/429

(Continued)

FOREIGN PATENT DOCUMENTS

DE 2322589 A1 11/1973
DE 1956162 U 2/1976

(Continued)

OTHER PUBLICATIONS

International Preliminary Report on Patentability, dated Feb. 6, 2024, for International Patent Application No. PCT/DE2022/100534. (7 pages).

(Continued)

*Primary Examiner* — Neil Abrams
(74) *Attorney, Agent, or Firm* — Seed Intellectual Property Law Group LLP

(57) ABSTRACT

An electrical contact element is provided that includes a connection region for connecting an electrical conductor and a contact region for contacting a counter-contact element, wherein the connection region is substantially in the form of a hollow cylinder and includes an internal wall surface and an external wall surface, and wherein, in the connection region, a contacting body is arranged with which strands of the conductor can be pressed against the internal wall surface of the connection region. A method is also provided wherein the strands of the conductor to be connected are introduced into the connection region of the contact element and a mandrel of the blind rivet is pulled out on the contact side using riveting pliers. The contacting body is compressed in the process and as a result the strands are pressed against the internal wall of the connection region. Lastly, the mandrel breaks off at a defined breaking point.

9 Claims, 2 Drawing Sheets

(56) References Cited

U.S. PATENT DOCUMENTS

| | | | | |
|---|---|---|---|---|
| 3,906,623 | A | 9/1975 | Clabburn et al. | |
| 4,288,311 | A * | 9/1981 | Singleton | C25D 17/005 439/429 |
| 2007/0259562 | A1 * | 11/2007 | Holland | H01R 4/2412 439/429 |
| 2013/0052888 | A1 | 2/2013 | Wolting et al. | |

FOREIGN PATENT DOCUMENTS

| | | | |
|---|---|---|---|
| DE | 102010032911 | A1 | 2/2012 |
| EP | 2569825 | B1 | 5/2018 |
| FR | 3050579 | A1 | 10/2017 |

OTHER PUBLICATIONS

International Search Report and Written Opinion, mailed Oct. 21, 2022, for International Patent Application No. PCT/DE2022/100534. (11 pages) (with English translation of International Search Report).

Office Action, dated Mar. 31, 2022, for German Patent Application No. 10 2021 120 465.8 (6 pages).

* cited by examiner

ELECTRICAL CONTACT ELEMENT AND METHOD FOR CONNECTING A CONDUCTOR TO SAME

BACKGROUND

Technical Field

The present disclosure relates to an electrical contact element and a method for fastening an electrical contact element to a stranded conductor with the aid of a blind rivet.

Contact elements may be used in plug conductors for transmitting electrical currents. Using a plug connection, energy and/or data transmission may take place to an electrical device.

Description of the Related Art

The document EP 2 569 825 B1 discloses contact elements, which are intended for the crimped connection of stranded conductors. For this purpose, these contact elements comprise a substantially hollow-cylindrical connection region. The connection region has an inner wall surface and an outer wall surface. During the crimping process, the connection region is pinched from the outside. Pressure is thereby exerted onto the outer wall surface so that the inner wall surface is pressed against the strands of the conductor, as a result of which they are fixed on the contact element. The connection region is irreversibly deformed during the crimping process, and its diameter thereby changes.

During the crimping process, cracks that entail various disadvantages, such as in the ageing behavior, often occur in the connection region. In order to avoid crack formation in the connection region during the crimping method, in the connection region at least one axial slit is provided in its lateral surface. Such slits need to be manufactured by additional machining operations, which increases the manufacturing costs. In general, microcracks nevertheless occur, which may as a long-term consequence cause corrosion in the crimping region and therefore impair the electrical carrying capacity of the system consisting of the contact element and the conductor.

The German Patent and Trade Mark Office has searched the following prior art in the priority application for the present application: DE 10 2010 032 911 A1, DE 19 56 162 U and EP 2 569 825 B1.

BRIEF SUMMARY

Embodiments of the present disclosure provide a reliable electrical contact element, which can also be produced favorably.

The electrical contact element described herein includes a connection region for connecting an electrical conductor, such as a stranded conductor. The connection region is substantially configured in the form of a sleeve, or hollow cylinder. The cross section of the connection region is substantially circular, although polygonal cross sections, for example stellate cross sections, are likewise possible. The connection region has an inner wall surface and an outer wall surface.

The contact element described herein includes a contact region for contacting a mating contact element. The contact region may be configured in the form of a pin, in which case the contact element is a pin contact element. The contact region may also comprise axially protruding blades which are inclined with respect to one another, in which case the contact element is a bushing contact element.

In some embodiments, a contacting body may be arranged inside the connection region. Using the contacting body, the strands of the stranded conductor can be pressed against the inner wall surface of the connection region. In some embodiments, the strands of the conductor are pressed against the inner wall of the connection region rather than the inner wall of the connection region being pressed against the strands as in the crimping process.

In some embodiments, the contacting body is irreversibly plastically deformable. When the stranded conductor is being connected, the contacting body is therefore irreversibly plastically deformed. Such electrical contacting is reliable. The contact element cannot, however, be recycled. This disadvantage must be accepted.

In the contact element described herein, the connection region of the contact element is not deformed, or is deformed only insubstantially, so that crack formations that may occur, for example during the crimping process, are reliably avoided.

In some embodiments, the contacting body is substantially configured as a hollow cylinder. Such shapes may be produced easily from a technical viewpoint. Furthermore, the cylindrical shape also corresponds to the connection region of the contact element, so that uniform pressing of the strands is ensured.

Advantageously, the contacting body may be converted from an insertion state into a clamping state. In the insertion state, the contacting body, or its outer surface, is still far away from the inner wall of the connection region. The strands of the conductor can be inserted into this intermediate region, or arranged therein. In the clamping state, the contacting body, or its outer surface, is arranged close to the inner wall of the connection region so that the strands are clamped firmly between the contacting body and the inner wall of the connection region, as a result of which the conductor as a whole is clamped firmly on the contact element.

In one embodiment, the contacting body has a first height H1 and a first diameter D1 in the insertion state. In the clamping state, the contacting body assumes a second height H2 and a second diameter D2. The first height H1 is greater than the second height H2 and the second diameter D2 is greater than the first diameter D1. This of course means that the contacting body is reduced in its height during the conversion from the insertion state into the clamping state, and at the same time its diameter increases. This may also be referred to as compression of the contacting body.

In some embodiments, the contacting body is fixed securely in the connection region. This way, the contact element may be delivered in one piece. The contacting body is in this case advantageously screwed or adhesively bonded or soldered or welded or clamped in the connection region. Such fastening methods have been found to be suitable.

In one embodiment, the contact element may include a blind rivet. The contacting body is then formed by the rivet body of the blind rivet. The rivet body of the blind rivet is configured to match the connection region of the contact element.

Blind rivets are well known in the technical field. They are used to connect two components, for example two metal sheets. The document DE 1 956 162 U1 discloses a processing tool for blind rivets, which is also referred to as a rivet gun.

The blind rivet described herein consists substantially of a barrel-shaped rivet body. The barrel-shaped rivet body has a bottom with a central opening. Inside the connection region, the bottom is directed upward, that is to say counter to the insertion direction of the strands of the conductor. In the opening, there is an elongate mandrel with a rivet head on the end, the diameter of which is greater than the opening diameter, the rivet head being braced on the bottom of the connection region. The mandrel extends axially from the connection region to the contact region. The mandrel is provided with a premade break point, which is arranged just behind the rivet head. The function of the premade break point will be explained below.

A stranded conductor is connected to the electrical contact element with the aid of a blind rivet in the following way. A rivet body and a part of its associated mandrel of the blind rivet are arranged in the connection region of the contact element. The mandrel extends axially inside the contact element and protrudes from the contact element on the side of the contact region.

First, the strands of the conductor to be connected are inserted into the connection region of the contact element. The mandrel of the blind rivet is then pulled out of the contact element on the contact side. A suitable crimping tool is used for this. The rivet body is thereby compressed as described above, so that the strands are ultimately pressed against the inner wall of the connection region (aAB). Finally, by the application of a further tensile force, the mandrel breaks off at its premade break point inside the rivet body.

In some embodiments, the hollow-cylindrical connection region (AB) has a diameter (DAB) which remains unchanged during the method described herein, that is to say throughout the entire strand crimping method.

BRIEF DESCRIPTION OF THE SEVERAL VIEWS OF THE DRAWINGS

Embodiments of the disclosure are shown in the drawings and will be explained in more detail below.

The figures may contain partially simplified schematic representations. Identical reference signs are sometimes used for similar elements which are equivalent but possibly not identical. Different views of the same or similar elements may be scaled differently. Direction indications, for example "left," "right," "up" and "down," are to be understood with reference to the figure in question, and may vary in relation to the object represented in the individual representations.

DETAILED DESCRIPTION

Figure 1:
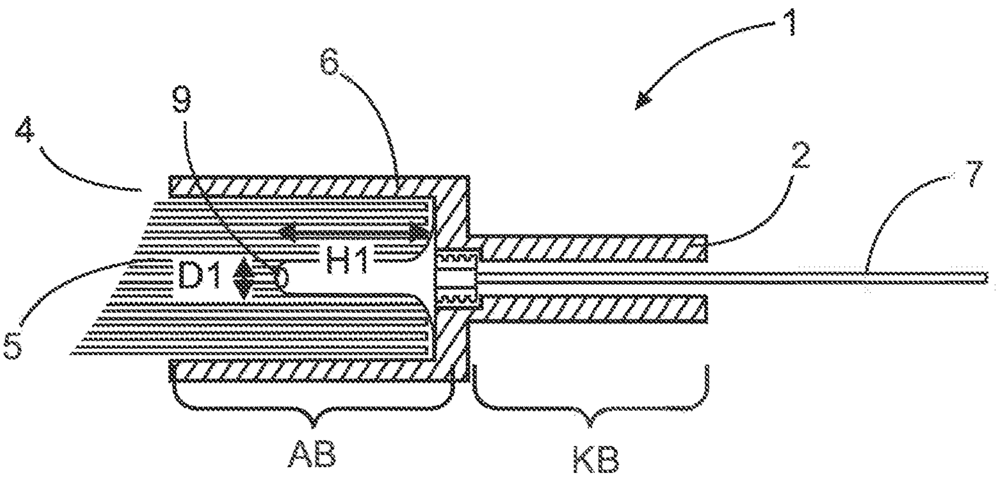
FIG. 1 shows a sectional representation of a pin contact element in an insertion state.
Figure 2:
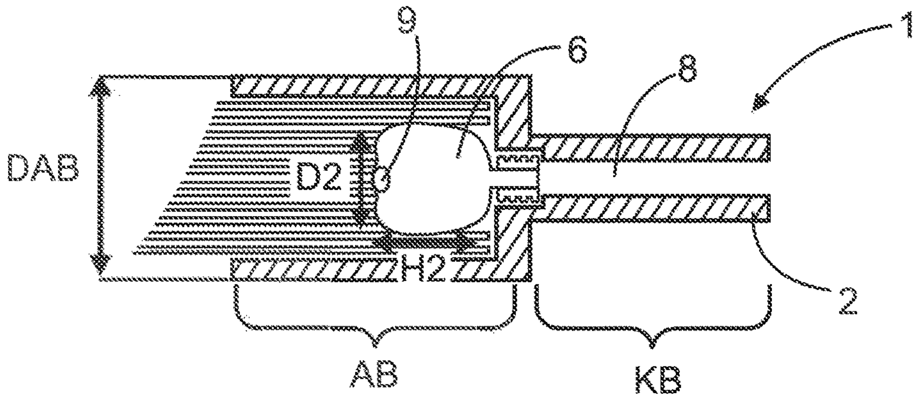
FIG. 2 shows a sectional representation of a pin contact element in a clamping state.

FIG. 1 and FIG. 2 show a contact element 1 according to an embodiment of the disclosure, which is configured as a pin contact element. The contact element 1 includes a connection region AB, to which strands 5 of a conductor 4 are connected, and a contact region KB which is used for contacting with a mating contact element. The contact region KB consists of a so-called contact pin 2, which can be inserted into a contact bushing 3 intended therefor. The connection region AB substantially has the shape of a hollow cylinder.

A contacting body 6 is arranged inside the connection region AB. The contacting body 6 is located at the center of the connection region AB. This means that the distance between the lateral surface of the contacting body 6 and the inner wall surface of the connection region AB, lying within a plane, is always the same.

The contacting body 6 substantially has the shape of a hollow cylinder. In FIG. 1 (similarly as in FIG. 3), the contacting body 6 is in its insertion state. In the insertion state, the strands 5 of the conductor 4 can be inserted into the connection region AB of the contact element 1. The strands 5 are in this case arranged around the contacting body 6.

In FIG. 2 (similarly as in FIG. 4) the contacting body 6 can be seen in its clamping state. Here, the strands 5 of the conductor 4 are pressed against the inner wall surface of the connection region AB so that the conductor 4 is electrically conductively connected and fixed to the contact element 1.

Figure 3:
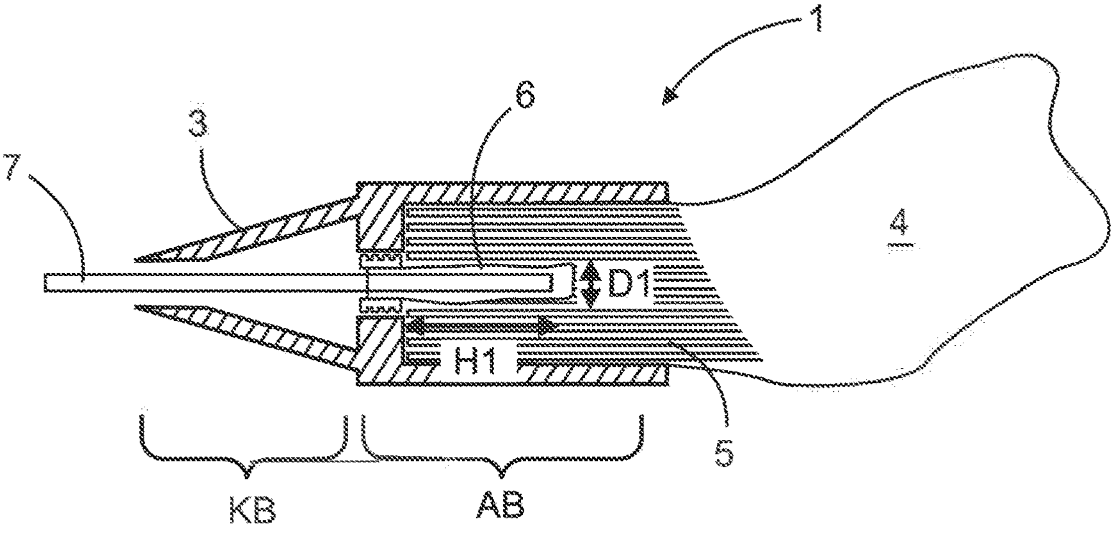
FIG. 3 shows a sectional representation of a bushing contact element in the insertion state.
Figure 4:
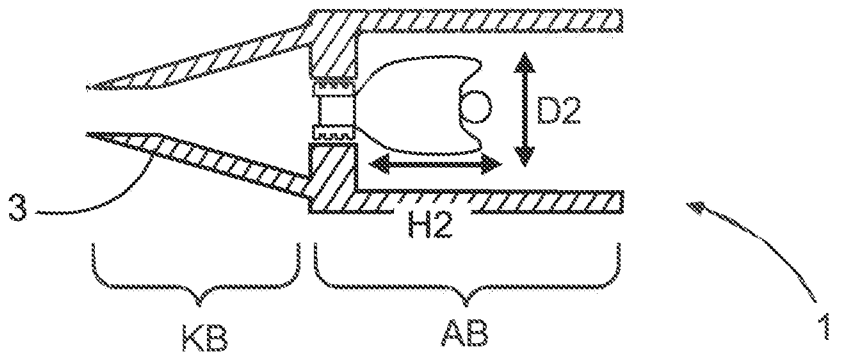
FIG. 4 shows a sectional representation of a bushing contact element in the clamping state.

Similarly as for the pin contact element in FIGS. 1 and 2, FIGS. 3 and 4 represent a bushing contact element 1. The contact bushing 3 consists of individual blades (not visible for reasons of representation) which are bent radially inward. In the state in which the pin contact element and the bushing contact element are plugged together, the contact pin 2 is enclosed by the contact bushing 3, the blades pressing onto the contact pin and thereby establishing a reliable electrical contact. FIG. 3 shows the contacting body 6 in its insertion state. FIG. 4 shows the contacting body 6 in its clamping state.

During the conversion from the insertion state into the clamping state, the contacting body 6 of the contact element 1 is compressed. The contacting body 6 has a first height H1 and a first diameter D1 in the insertion state. In the clamping state, the contacting body 6 has a second height H2 and a second diameter D2. The second height H2 accordingly decreases ($H2<H1$) while the second diameter D2 increases ($D2>D1$).

The contacting body 6 is a constituent part of a blind rivet specially shaped for this field of application. The contacting body 6 forms the rivet body of the blind rivet. The contacting body 6 is pulled through by a mandrel 7, which has a premade break point. The mandrel 7 extends in the direction of a through-opening 8 inside the contact element 1 and protrudes from the contact element 1 on a contact side of the contact region (KB). The protruding part may be gripped by a rivet gun (not shown).

The contacting body 6 (also referred to as the rivet body) is configured substantially in the shape of a cup with a circular cross section. The cup bottom faces in the connection direction and has an opening, on which a rivet head 9 externally bears. The diameter of the rivet head 9 is greater than the diameter of the opening in the contacting body 6, so that the tensile force applied to the mandrel 7 is transferred through the rivet head 9 onto the contacting body 6, as a result of which the above-described compression of the latter takes place.

The contacting body 6 (also referred to as the rivet body) and a part of its associated mandrel 7 are arranged in the connection region AB of the contact element 1. The mandrel 7 protrudes from the contact element 1 on the contact side of the contact region (KB).

When the conductor 4 and the contact element 1 are being connected, the strands 5 of the conductor 4 to be connected are first inserted into the connection region AB of the contact element 1.

With the aid of a rivet gun, the mandrel 7 of the blind rivet is then pulled out of the contact element 1 on the contact side. The contacting body 6 (rivet body) is thereby compressed, and the strands 5 are consequently pressed against the inner wall of the connection region AB. The mandrel 7 subsequently breaks off at a premade break point (not represented) inside the contacting body 6 (rivet body). A diameter DAB of the connection region AB remains unchanged, or at least almost unchanged, throughout the entire strand crimping method.

Figure 5:
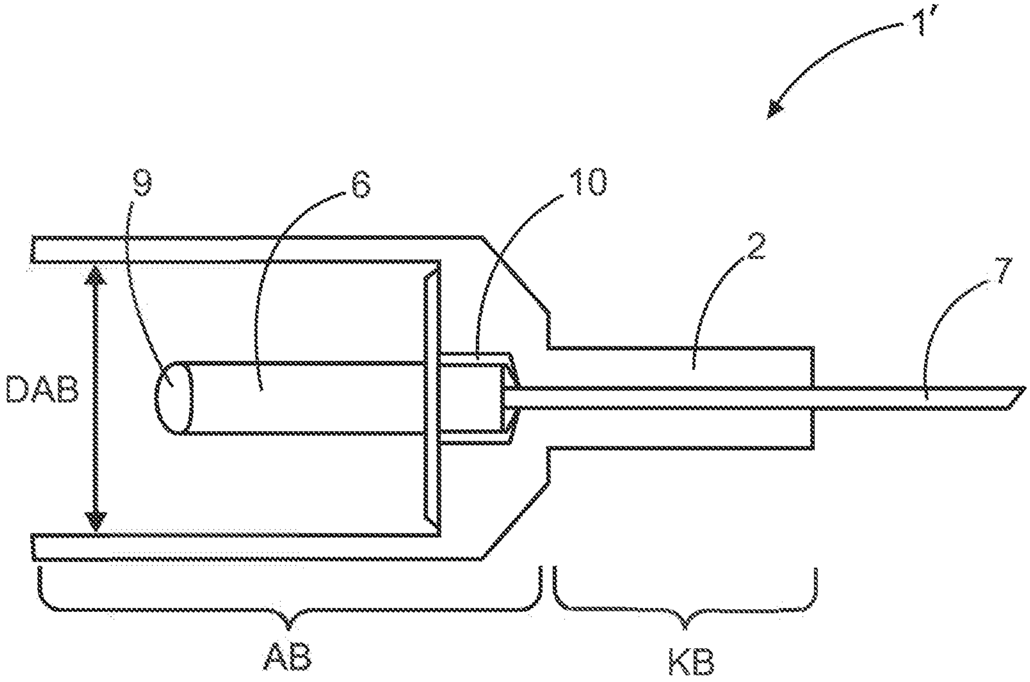
FIG. 5 shows a sectional representation of a further embodiment of a bushing contact element.

FIG. 5 represents a further embodiment of a contact element 1' described herein. Only a pin contact element is shown. A corresponding bushing contact element may, however, be produced in a similar way. The contact element 1' is shown in the insertion state in FIG. 5. A clamping state may be extrapolated similarly from the other figures.

In the contact element 1 represented here, the contacting body 6 is screwed in the connection region AB. For this purpose, a screw thread 10 is provided in the connection region AB. Because of the reliable anchoring, or fastening, of the blind rivet on the contact element 1', such contact elements l' may be processed by a machine, in the present case as bulk goods.

In general, the present disclosure relates to an electrical contact element 1, 1', which includes a connection region AB for connecting an electrical conductor 4 and a contact region KB for contacting a mating contact element, the connection region AB substantially being configured in the form of a hollow cylinder and having an inner wall surface and an outer wall surface, a contacting body 6, by which the strands 5 of the conductor 4 can be pressed against the inner wall surface of the connection region AB, being arranged inside the connection region AB. The strands 5 of the conductor 4 to be connected are inserted into the connection region AB of the contact element 1, l', and the mandrel 7 of the blind rivet is subsequently pulled out on the contact side with the aid of a rivet gun, the contacting body 6 is thereby compressed and the strands 5 are consequently pressed against the inner wall of the connection region AB. Finally, the mandrel breaks off at a defined premade break point.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical contact element, comprising:

a connection region for connecting an electrical conductor and a contact region for contacting a mating contact element, the connection region substantially being configured in the form of a hollow cylinder and having an inner wall surface and an outer wall surface, wherein a contacting body, by which strands of the electrical conductor can be pressed against the inner wall surface of the connection region, is arranged inside the connection region, wherein the contact element comprises a blind rivet, and wherein the contacting body is formed by a rivet body of the blind rivet.

2. The electrical contact element as claimed in claim 1, wherein the contacting body is irreversibly plastically deformable.

3. The electrical contact element as claimed in claim 1, wherein the contacting body is substantially configured as a hollow cylinder.

4. The electrical contact element as claimed in claim 1, wherein the contacting body is convertible from an insertion state into a clamping state.

5. An electrical contact element, comprising:

a connection region for connecting an electrical conductor and a contact region for contacting a mating contact element. the connection region substantially being configured in the form of a hollow cylinder and having an inner wall surface and an outer wall surface, wherein a contacting body, by which strands of the electrical conductor can be pressed against the inner wall surface of the connection region, is arranged inside the connection region, wherein the contacting body is convertible from an insertion state into a clamping state, and wherein the contacting body has a first height and a first diameter in the insertion state and a second height and a second diameter in the clamping state, the first height in the insertion state being greater than the second height in the clamping state and the second diameter in the clamping state being greater than the first diameter in the insertion state.

6. The electrical contact element as claimed in claim 1, wherein the contacting body is fixed securely in the connection region.

7. The electrical contact element as claimed in claim 6, wherein the contacting body is screwed, adhesively bonded, soldered, welded or clamped in the connection region.

8. A method for fastening an electrical contact element to a conductor with the aid of a blind rivet, wherein the electrical contact element has a contact region and a hollow-cylindrical connection region, wherein a contacting body and a part of an associated mandrel thereof are arranged in the connection region of the electrical contact element and the mandrel protrudes from the electrical contact element on a contact side of the contact region, the method comprising:

inserting strands of the conductor to be connected into the connection region of the electrical contact element;

pulling the mandrel of the blind rivet out of the contact side of the contact region, thereby compressing the contacting body and pressing the strands against an inner wall of the connection region; and breaking off the mandrel at a premade break point.

9. The method as claimed in claim 8, wherein the hollow-cylindrical connection region has a diameter, and wherein the diameter of the hollow-cylindrical connection region remains unchanged during the inserting of the strands, the pulling of the mandrel, the compressing of the contacting body, the pressing of the strands, and the breaking off of the mandrel.

* * * * *